US009851461B1

(12) United States Patent
Ainsleigh et al.

(10) Patent No.: US 9,851,461 B1
(45) Date of Patent: Dec. 26, 2017

(54) MODULAR PROCESSING SYSTEM FOR GEOACOUSTIC SENSING

(75) Inventors: Phillip L. Ainsleigh, Middletown, RI (US); George D. Anderson, Middletown, RI (US); Stephen G. Greineder, East Greenwich, RI (US); Brian F. Harrison, Portsmouth, RI (US); Paul A. L'Etoile, Wakefield, RI (US); Ian C. McIntosh, Warren, RI (US); Raymond J. Rowland, Noank, CT (US); Robert J. Stahl, Bristol, RI (US); Jason R. McKenna, Vicksburg, MS (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 1666 days.

(21) Appl. No.: 13/439,132

(22) Filed: Apr. 4, 2012

(51) Int. Cl.
| | |
|---|---|
| *G01V 1/00* | (2006.01) |
| *G01S 3/80* | (2006.01) |
| *G01S 5/18* | (2006.01) |
| *G01S 11/14* | (2006.01) |

(52) U.S. Cl.
CPC ............ *G01V 1/001* (2013.01); *G01S 3/8006* (2013.01); *G01S 5/18* (2013.01); *G01S 11/14* (2013.01)

(58) Field of Classification Search
CPC .......... G01S 3/8006; G01S 5/18; G01S 11/14; G01S 15/04; G01V 1/001
USPC ........................................ 367/124, 129, 136
See application file for complete search history.

(56) References Cited

U.S. PATENT DOCUMENTS

| | | | | | |
|---|---|---|---|---|---|
| 3,261,009 | A | * | 7/1966 | Stetten ................... | G01V 1/001 340/526 |
| 3,805,260 | A | * | 4/1974 | Barowitz ............... | G01V 1/001 307/117 |
| 4,558,439 | A | * | 12/1985 | Gu/ desen ............. | G01S 3/8036 367/127 |
| 5,047,995 | A | * | 9/1991 | Wells ...................... | G01S 3/808 340/566 |
| 5,054,006 | A | * | 10/1991 | Gimber .................. | G01V 1/001 367/136 |

(Continued)

OTHER PUBLICATIONS

Roy L. Streit and Tod E. Luginbuhl, Probabilistic Multi-Hypothesis Tracking, Technical Report, Feb. 15, 1995, pp. 1-48. Navy. USA.

(Continued)

*Primary Examiner* — Ian J Lobo
(74) *Attorney, Agent, or Firm* — James M. Kasischke; Michael P. Stanley (57) ABSTRACT

A system for analyzing a plurality of channels of data received from a sensor array. The system includes a data acquisition system that receives and independently processes each channel. A low-level processing section receives each channel of processed data and identifies signals of interest in one channel. Signals of interest are stored in an event database. A high-level processing section analyzes data occurring over a preset duration of time and across multiple channels of data and communicates with an operator machine interface. The operator machine interface provides analysis to an operator. Further aspects of the system characterize the data in order to indicate the data source and alert the operator to signals having certain predefined characteristics.

20 Claims, 3 Drawing Sheets

(56) References Cited

U.S. PATENT DOCUMENTS

| | | | | |
|---|---|---|---|---|
| 8,405,524 B2 * | 3/2013 | Richman | ............... | G01V 1/001 340/933 |
| 2004/0156266 A1 * | 8/2004 | McDonald | ............... | B63G 9/04 367/136 |

OTHER PUBLICATIONS

Donald B. Reid, An Algorithm for Tracking Multiple Targets, Article, Dec. 6, 1979, pp. 843-854, vol. AC-24, No. 6, IEEE, USA.

Thiagalingam Kirubarajan and Yaakov Bar-Shalom, Probabilistic Data Association Techniques for Target Tracking in Clutter, Article, Mar. 3, 2004, pp. 536-557, vol. 92, No. 3. IEEE, USA.

Henk A.P. Blom and Yaakov Bar-Shalom, The Interacting Multiple Model Algorithm for Systems with Markovian Switching Coefficents, Article, Aug. 8, 1988, pp. 780-783, vol. 33, No. 8, IEEE, USA.

\* cited by examiner

MODULAR PROCESSING SYSTEM FOR GEOACOUSTIC SENSING

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The current invention relates to a modular processing system for vibrational sensors and more particularly to a processing system for long arrays of geoacoustic sensors.

(2) Description of the Prior Art

Geoacoustic arrays can include a number of point geophones regularly spaced along the route. Alternatively, the sensor array could be realized using any one of a number of variants of linear fiber-optic sensors (e.g., those that utilize regularly spaced Bragg gratings, or which capitalize on natural scattering mechanisms such as Rayleigh backscattering or Brillion scattering). For the purposes herein, geoacoustic energy is defined as vibrational energy travelling through the earth from surface and near surface activities.

Long arrays of geoacoustic sensors are a relatively recent technology, brought on primarily by developments in linear fiber-optic and related sensors. As such, there has been little prior development on automatic processing for these types of sensor arrays. Such processing strings are more common for marine passive sonar sensors that utilize various configurations of hydrophones. Techniques used in marine sensor arrays may have some applicability to geoacoustic signal processing.

There are a number of key differences that distinguish geoacoustic sensing application from the marine sonar application. One distinction is that geoacoustic arrays can span greater distances (currently several tens of kilometers but potentially many hundreds of kilometers). Over these distances, the arrays can encounter a greater diversity of propagation environments than do hydrophone arrays. This diversity usually manifests itself when the sensors are being installed in different locations, but diverse environments also can be encountered within the span of a single sensor (e.g., a sensor that is 100 km in length can cross through a number of different soil types). Another distinction is that the specific signatures of interest in terrestrial applications are significantly different from and more varied than those encountered in maritime applications. Finally, the types of situational awareness that can be derived from geoacoustic sensors cover a wider range than those from sonar arrays. These types of situational awareness range from detecting a person or vehicle crossing over the sensor at a given location to complex analyses of behavior patterns along different sections of the sensor.

These distinguishing characteristics point to the need for a highly modular and flexible processing system that examines not only the energy occurring within each zone of interest, but also considers spatial relationships among the seismic energy received in the different zones.

SUMMARY OF THE INVENTION

A first object of the invention is to provide detection, classification, localization, and display capabilities for arrays of vibrational sensors.

A second object is automatic generation and display of sensor information that allows system users to make informed decisions concerning activities of interest near the sensors.

A further object is the provision of a processing system that is independent of the specific type of sensor utilized, so long as the component sensors provide well-defined zones of coverage along a route of interest.

Accordingly, there is provided a system for analyzing a plurality of channels of data received from a sensor array. The system includes a data acquisition system that receives and independently processes each channel. A low-level processing section receives each channel of processed data and identifies signals of interest in one channel. Signals of interest are stored in an event database. A high-level processing section analyzes data occurring over a preset duration of time and across multiple channels of data and communicates with an operator machine interface. The operator machine interface provides analysis to an operator. Further aspects of the system characterize the data in order to indicate the data source and alert the operator to signals having certain predefined characteristics.

Other objects and advantages of the present invention will become apparent from the following description, drawings and claims.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DETAILED DESCRIPTION OF THE INVENTION

Figure 1A:
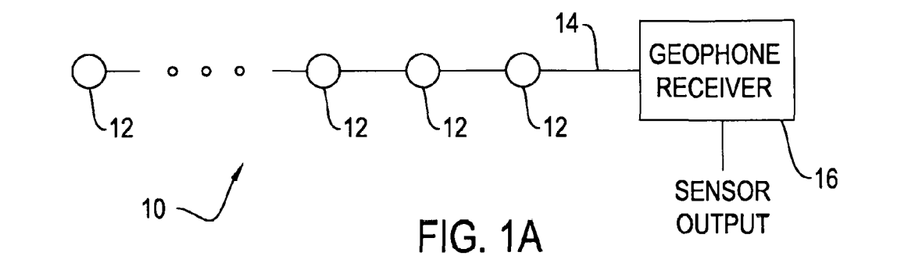
FIG. 1A is a diagram of a first possible sensor embodiment.
Figure 1B:
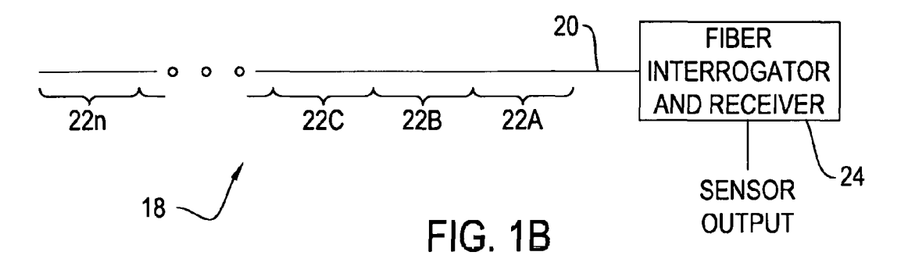
FIG. 1B is a diagram of a second possible sensor embodiment.

The processing system operates on the output of a linear array of geoacoustic sensors. FIG. 1A shows an array 10 that utilizes point geophones 12 on a telemetry link 14. Telemetry link 14 terminates at a geophone receiver 16. FIG. 1B shows an array 18 that utilizes optical time-domain reflectometry (OTDR) techniques to sub-divide a continuous optical fiber 20 into zones of interest 22A, 22B through 22$n$. "n" can be any number of zones of interest as determined by the sensor technology. Optical fiber 20 is joined to a fiber interrogator and receiver 24. While FIGS. 1A and 1B show the geophones and zones oriented along a straight path, the actual path can have any shape required for the application (subject only to the bending radius of the telemetry cable or fiber-optic cable). Other technologies can be used for sensor input including radio-linked vibrational sensors and fiber optic arrays having Bragg gratings formed therein.

Each geophone or zone constitutes an input channel to the processing system. The number of channels is typically many thousands (possibly tens or hundreds of thousands). The channel data provide a spatial and temporal view of the acoustic energy around each point geophone or fiber zone. The processing system operates simultaneously on all channels and generates relevant information in real time.

Figure 2:
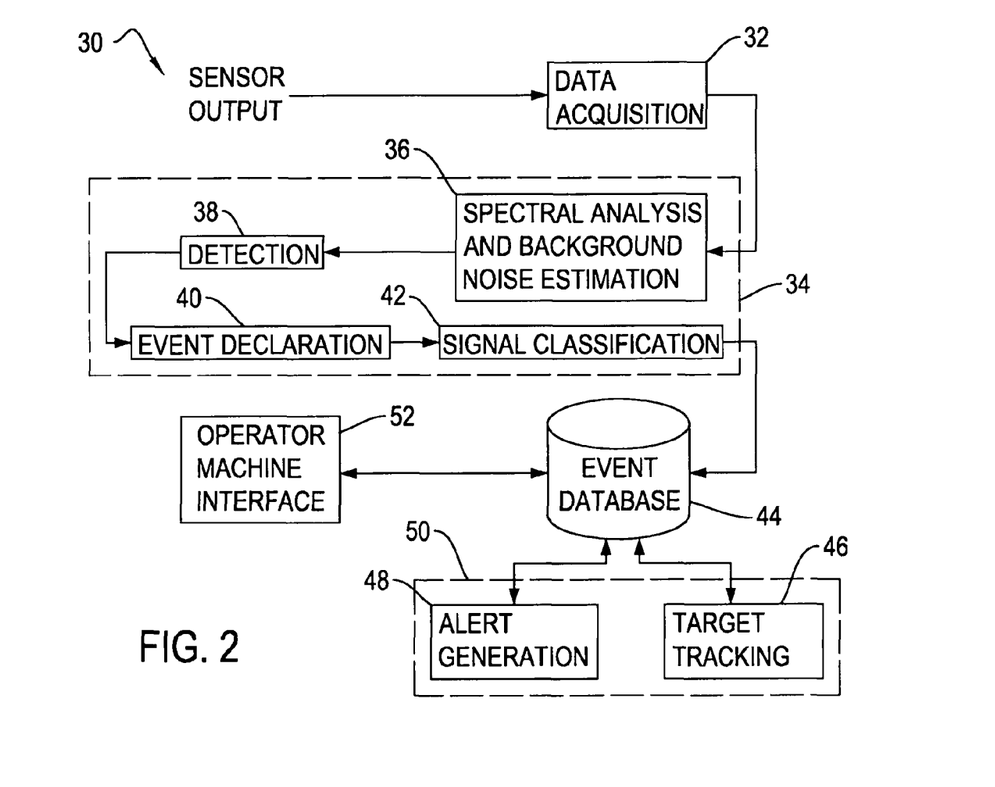
FIG. 2 is a diagram of a processing system for received sensor signals.

The processing system is a chain of functional data processing units that include data acquisition, spectral estimation, signal detection, signature classification, target tracking, rule-based logic, and display software to extract and communicate the salient information from the sensor outputs to human operators. The flow diagram in FIG. 2 provides a high-level view of the system 30 and its functional units. All functions are implemented in software (e.g., the current system realization is implemented in the C++ and JAVA languages) and hosted on multiple signal processing or computing hardware platforms that are connected in a local area network (currently a network utilizing TCP/IP). Sensor input is provided to a data acquisition system 32. Low-level automation functions 34 operate on each data channel independently. Low-level automation functions include spectral analysis and background noise estimation 36, signal detection 38, event declaration 40, and signal classification 42. These computations are performed in parallel and are distributed across multiple hardware platforms to handle the large numbers of data channels and signature models required in many applications. Because the low-level automation functions 34 are associated with each data channel and with a particular sensor, the low-level automation can be tailored to the particular situation of the associated sensor. Different signals and events in the low-level automation 34 could be associated with the different parts of the array. For example, one part of the array could be under a road and another part could be near a fence line.

The modular distributed architecture allows easy inclusion of additional processing nodes to accommodate the addition of more sensor channels or signature models. Distributed processing is currently achieved using the Common Object Request Broker Architecture (CORBA) protocol; however, another distributed processing protocol known in the art could be used. The results of the low-level automation are stored in a database 44, which may be stored on a processing workstation hosting a user interface or on a shared network drive. Database 44 can use any available data storage technology or hardware. The target tracking 46 and alert generation 48 functions operate simultaneously in space and time (i.e., these functions look across channels), and are therefore referred to as "high-level automation" functions 50 to distinguish them from those that process channels independently. These functions are implemented as stand-alone software processes that read from and write back to the event database 44. The database 44 is also accessed by the operator machine interface (OMI) 52, which, in addition to providing a general mechanism for an operator to interact with the system 30, presents information in a form that can be best utilized by the operator. The hardware that hosts the interface function 52 can be located at a remote location, provided adequate bandwidth communication is available between the interface hardware and the rest of the system hardware. Each of these functions is described in more detail below.

Figure 3:
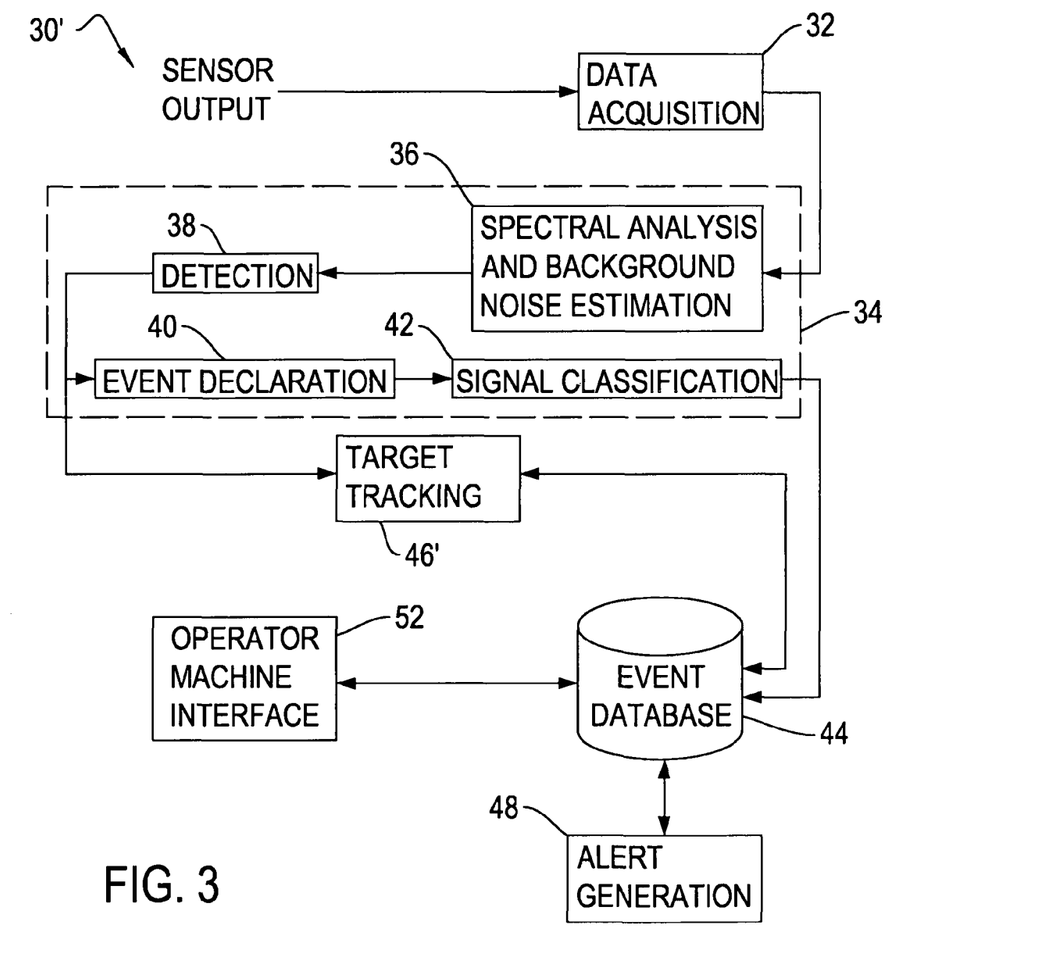
FIG. 3 is a diagram of an alternate embodiment of a processing system for received sensor signals.

FIG. 3 is a diagram of an alternate embodiment of the processing system 30'. In this embodiment, target tracking system 46' interfaces directly with signal detection component 38 of each channel's low-level automation functions 34. Target tracking system 46' is joined to receive multiple channels of data as a high-level automation system. This allows faster target tracking because target tracking data does not need to be processed through the signal classifier 42 and the database 44 before tracking. A further advantage is that in this embodiment database 44 needs to maintain less data. The alert generation function 48 continues to be a high-level automation routine that receives data from multiple channels.

Discussion of the processing system 30 requires definition of terms and symbols. The following terms are used. A "sample" is one value from the digital channel data. The "sampling rate" is the number of samples per second in each channel of data. A "frame segment" is a group of channel data samples of a pre-defined time duration. An "event collection" is a group of frame segments. The following symbols are used with the above definitions: "K" is the number of channels; "fs" is sample rate of digital data from each channel; "N" is the number of samples in each frame of data; "T" is the time duration of each frame of data; and "L" is the number of frames used in background noise estimation.

Figure 4:
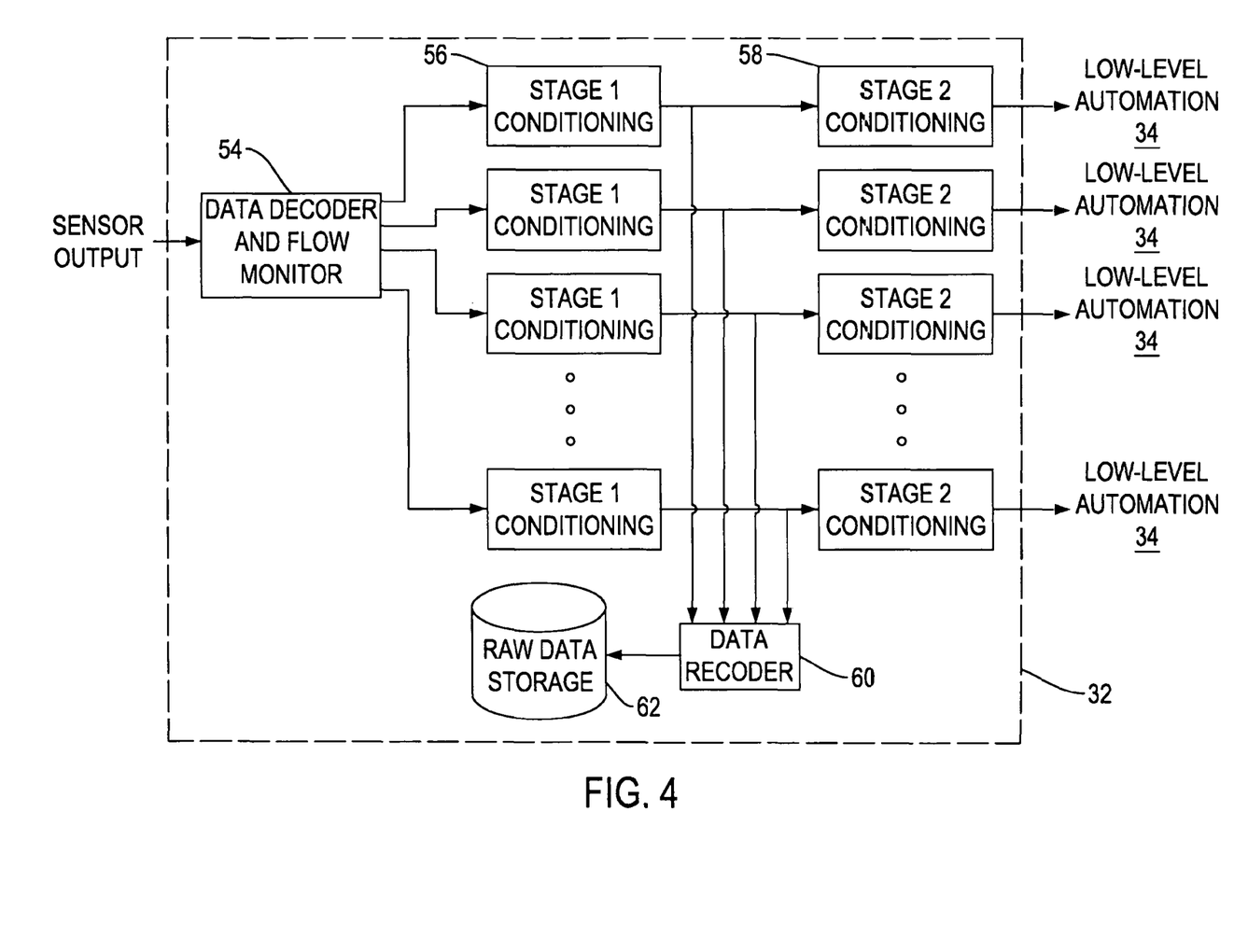
FIG. 4 is a diagram of a data acquisition module for received sensor signals.

FIG. 4 provides details concerning data acquisition system 32. The sensor array generates K channels of digital time-series data and communicates these data to a system interface. This digital time series data is encoded in a data structure that is associated with the given sensor. The data acquisition function 32 includes a data decoder and flow monitor 54 to decode the sensor's data structure to obtain streams of time series data. Data decoder and flow monitor 54 also continuously monitors the data flow and ensures that data is being received. The data acquisition function 32 also performs front-end signal conditioning. Data decoder and flow monitor 54 breaks the sensor output into separate channels of data associated with a particular zone or geophone.

The front end signal conditioning includes high-pass filtering to eliminate very low frequency noise associated with the sensor's internal components and background seismic energy in the earth. It also includes anti-alias filtering and decimation in order to reduce the data rate. Decimation-by-two is used with currently known sensors; however, other decimation rates can be used depending on sensor sampling rates. The data acquisition function 32 can be tailored to the specific kind of sensor attached to the system. For example, decimation is especially relevant for pulsed-laser fiber sensors, where a very high sampling rate in the sensor is required to avoid spectral aliasing. Because these sensors are inherently digital, there is no opportunity to perform analog anti-alias filtering prior to digitizing.

Data acquisition system 32 allows recoding of time-series data in the sensor output format and storage of this data. This facilitates playback through a sensor simulation system, thereby providing a convenient mechanism for analysis, system training and demonstration in the laboratory environment. In order to maximize flexibility, the signal conditioning functions are broken into a pre-storage stage 56 (stage 1 conditioning) and a post-storage stage 58 (stage 2 conditioning) as shown in FIG. 4. The pre-storage stage 56 is joined to provide conditioned data to a data recoder 60. Data recoder 60 encodes the data such as by multiplexing to allow the data to be stored in a raw data storage system 62. These stages allow high-pass filtering to be performed before or after data storage. Similarly, the decimate-by-two stages can be distributed before and after storage such that the stored data can be sampled at the full sensor output rate or decimated by any factor of two (e.g., half sample rate, quarter sample rate, etc.) Any signal-conditioning functions not performed in Stage 1 56 (prior to storage) are performed in stage 2 58 (after storage but before processing). After stage 2 conditioning, conditioned data is provided to low-level automation 34.

Spectral analysis and background noise estimation 36 is the first step in low-level automation 34. In this process the conditioned time-series data from each channel are buffered and segmented into frames with duration T seconds (such that each frame contains $N=T \times f_s$ digital samples). Each frame of time-domain data is then converted to the frequency domain using an N-point fast Fourier transform (FFT), which provides a digitized approximation to the spectral energy in that frame. Other similar transforms known in the art could also be used here. A subset of the transform outputs is extracted to disregard frequencies whose corresponding energy is either irrelevant, unreliable, or previously removed by filtering. A running spectral background noise estimate is computed and maintained for each channel of data. This background noise estimate is computed by keeping a running average of the energy at each frequency over the last L frames of data. Whether the noise estimate is updated with a particular frame is governed by the detection status of the associated channel in that frame. For example, the background noise estimate for a particular channel is frozen during periods in which a signal has been detected in that channel.

A general-purpose detection algorithm is used by detection function 38 to determine whether the energy in a given channel and frame deviates significantly from the background noise estimate. While any general-purpose detector can be used in the system, the present system realization uses a power law detector such as known in the art for this function. In any case, if the energy from a given channel and frame is significantly different from the background noise estimate, then the detector 38 declares that there is a signal present in that frame. The detection algorithm computes a test statistic (typically a function of normalized magnitude-squared FFT outputs) and then compares this test statistic to a predetermined threshold. A Boolean detection flag is set to 'true' if the detection statistic exceeds the threshold, indicating a signal present; otherwise, the detection flag remains at the default value of 'false', indicating no signal present. This detection flag is used by the Background Noise Estimation function 36 to determine whether or not the background noise estimate should be updated. It is also used by the Event Declaration function 40 to determine whether the frame should be included in an event.

The Event Declaration function 40 uses the detection flag from each frame to decide whether the frame should be concatenated with other frames of data in the same channel to form a multi-frame event. For the most part, events will be constructed of contiguous frames, although short gaps are permitted within an event. The number of noise-only frames that are permitted between detected frames is governed by a software tuning parameter, which can be pre-established for the specific application or set by the user. Event durations are constrained to be less than a maximum allowable length to avoid very long delay times in downstream processing. Maximum allowable length is a predetermined control parameter. The data structure defining an event contains a unique identification number, channel number, start and stop times, average power, and other descriptive measures. Later processing stages provide additional information fields within this data structure.

Events defined by the event declaration function 40 are sent to the event classification function 42. Some events are screened at the front end of the classifier 42 if they do not meet some basic minimal criteria (e.g., they are too short in duration to be of interest), in which case they are assigned to the class of spurious noise. The remaining events are processed and assigned class identifications. These class identifications can take the form of code numbers signifying the signature class to which the event is assigned. Typical classes include but are not limited to human or animal foot traffic, vehicular traffic, manual or automated digging, various types of machinery, and natural phenomena such as rain.

The class assignment is made using a statistical classification approach with the following stages. First, a collection of descriptive features is computed from the event's time-series data. These features are selected in such a way that they capture the essential characteristics of signals from each class in a small number of variables. Typically, the features are parameters in a random-process model such as an autoregressive statistical model. Autoregressive models are commonly used in a wide range of statistical applications and are well documented. Note that the class specific classification method utilized here allows different sets of descriptive features to be used for each signature class. This method is disclosed in U.S. Pat. No. 6,535,641 to Baggenstoss which is incorporated by reference herein.

After determination of the descriptive features, the system applies a set of rules for certain classes of activities which may disqualify those classes from contention. Finally, the event in question is assigned to one of the remaining classes using a likelihood-based approach. That is, the classification algorithm computes the likelihood that the event features originated from each of the classes, and the class corresponding to the largest likelihood value is assigned to the event. The use of a likelihood-based classifier requires that the system contains sets of parameters that describe the probability density function (PDF) of features under each class hypothesis. The probability density function can include traditional (single-mode) density functions, mixture models, and dynamic stochastic models such as a hidden Markov model. These PDF parameters are obtained during an off-line classifier training stage in which labeled training samples for each class of interest are generated by performing and using the sensor to record controlled scripted activities (e.g., walking, vehicle passes, fence climbing, digging, etc.) in the vicinity of the sensor. Features computed from these labeled data samples are used with a statistical learning algorithm to compute the PDF model parameters for each class.

In some applications, certain sources are constrained to move along the sensor route (e.g., vehicles traveling along a roadway adjacent to the sensor path). In such cases, situational awareness can be enhanced by using an automated algorithm to track source movement as a function of time. Since any such algorithm must simultaneously examine energy across multiple channels of data, the target tracking function is an example of "high-level" automation, which operates here by reading from and writing back to the event database. When reading event data, the tracking function may treat as measurements all detected events in a given spatial region regardless of the signature class assigned to each event or it may operate only on those events that are associated with a particular signature class (e.g., vehicular traffic). In any case, the tracking results are stored back in the event database in structure fields that include a track identification number that links events that are part of the same track and kinematic information such as source velocity.

Note that in order to avoid out-of-sequence measurements due to the asynchronous processing encountered downstream of the Event Declaration function 40, the tracking algorithm delays reading events from the database for a maximum event duration. This maximum event duration is the predetermined amount of time for the particular event class. This ensures that no new event will be entered into the database after the current measurement update time in the tracker. The overall processing string still operates in real time, but with a uniform time lag in the output.

A large number of tracking algorithms are known in the sonar and air traffic control fields. For geoacoustic sensing systems, the selection of the particular tracking algorithm depends strongly on the details of the application and the types of situational awareness that are desired from the tracker (e.g., from the simplest situation in which the desire is to count vehicles along a short section of a rural roadway to complex scenarios in which the desire is to continuously track vehicles and pedestrians through an urban environment). In general, however, any realistic application will require a multi-target tracking algorithm such as the Multi-Hypothesis Tracking (MHT) algorithm described by D. B. Reid in "An algorithm for tracking multiple targets," IEEE Transactions on Automatic Control, February 1976, the Probabilistic Data Association (PDA) algorithm described by T. Kirubarajan and Y. Bar-Shalom in "Probabilistic Data Association Techniques for Target Tracking in Clutter," Proceedings of the IEEE, March 2004, or the Probabilistic Multi-Hypothesis Tracking (PMHT) algorithm described by R. Streit and T. Luginbuhl in Probabilistic Multi-Hypothesis Tracking, Technical Report 10428, Naval Undersea Warfare Center, February 1995, all of which are incorporated by reference herein. In some scenarios, a maneuvering-target tracking capability may be required. Such an algorithm is described by H. Blom and Y. Bar-Shalom in "The interacting multiple model algorithm for systems with Markovian switching coefficients," IEEE Transactions on Automatic Control, August 1988, which is also incorporated by reference herein. This algorithm provides maneuvering target tracking capability and has been previously used within all of the multi-target frameworks listed above.

The system must also provide alert generation to users or related systems. Typically, in a given application, the geoacoustic energy associated with activities of interest propagates to more than one channel, or the activity itself may be distributed across multiple adjacent channels. In addition, temporal gaps or pauses in a seismic activity can cause that activity to be broken into a number of sub-events of shorter duration. The alert generation function looks at each classified event and determines whether there is enough supporting evidence in adjacent regions of time and space to be linked as an activity of interest thus warranting the interest of a system operator. That is, this function connects events that constitute a higher-level activity. For example, this function may consider a temporal and spatial region around each classified event and require that some percentage of the area in that region is covered by other events of the same signature class. Certain other signature types may be treated as connecting events in this approach. If these other event types are encountered, then the region is expanded to consider a longer duration of time before the decision is made to generate an alert. For more complex activities of interest, the alert generator may require that certain ordered combinations of event signatures be encountered (e.g., a sequence of events that contains walking, fence rattling or cutting, and then more walking or running). In either case, there is no pre-determined size for high-level activities; the alert generator builds up activities of interest by progressively connecting classified events in time and space.

In some applications, the alert generator may utilize the output of the target tracking function. For example, if an activity of interest is known to be spatially stationary, then the velocity estimates from the tracker can be used to eliminate moving sources from consideration. Conversely, it may be desirable to constrain the field of interest to high-velocity sources (e.g., speeding vehicles).

The Operator Machine Interface (OMI) serves multiple functions. In addition to providing the basic platform for operator interaction, the OMI software prepares the processing results for display and then renders the information needed to identify and/or validate activities of interest. The OMI software can utilize many different display components. Four primary display components are identified as being particularly useful. These include a map display in which the sensor route and automated alerts are superimposed on a geographic map of the region; a zone-time energy history (or "waterfall") display that shows the received energy as a function of time and space (with event classifications color-coded and automated alerts superimposed); a signal analysis display that provides signature representations for declared events; and an alert list that provides an overview of recent automated alerts. The OMI can also provide the ability to listen to audio representations of the energy in a given channel. Utility for geoacoustic applications can be increased by providing display concepts for simultaneously rendering signature representations (such as time series and spectrograms) from numerous sensor channels, use of a bi-directionally linked cursor that allows geographic reconstruction of activities from the waterfall and map displays, rapid data labeling capabilities that permit easy generation of labeled training data for algorithm tuning, and an array registration functionality that permits easy association of sensor channels with geographic coordinates.

What has been proposed herein is a processing systems specially adapted to long arrays of geoacoustic sensors. A number of characteristics make it superior to potential alternative designs such as the direct adaptation of maritime passive sonar processing systems. The use of modular processing functions, especially within the signature detection and classification functions, allows the processing to be tailored to different sections of a long array spanning different geoacoustic environments. This means that the detector and classifier parameters can be set to different values in different parts of the array. Furthermore, the utilization of the class-specific classification method allows new classifier models to be added easily, without having to retrain the statistical models for existing classes. The numerous innovative properties of the operator machine interface also contribute to the uniqueness of the processing system for geoacoustic sensing.

The applications in which the resulting geocoustic sensor processing system can be used are numerous. Examples include military force protection, military and non-military asset protection, border security, infrastructure protection (e.g., dams, bridges, pipelines, or cables), or other security applications to detect border or perimeter breaches from surface, sub-surface, or airborne threats. The system can also be utilized to monitor routes of interest (such as a roadway), in which case the system can provide situational awareness regarding vehicular and/or foot traffic along the route (e.g., traffic density, vehicle velocities, etc.) or to detect and localize activities of interest along the route.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A system for analyzing a plurality of channels of data received from an array of acoustic sensors comprising:
   a data acquisition system capable of receiving and independently processing each channel of data;
   a low-level processing section joined to receive each channel of processed data from said data acquisition system, said low-level processing section capable of detecting and identifying a signal of interest in one channel of data;
   an event database joined to said low-level processing section to receive the detected and identified signals of interest from said low-level processing section;
   a high-level processing section joined to said event database, said high-level processing section being capable of analyzing data occurring over a preset duration of time and across multiple channels of data, said high-level processing section providing data analysis to said event database; and
   an operator machine interface joined to said event database for providing data analysis, and detected and identified signals of interest.

2. The system of claim 1 wherein said data acquisition system has a data storage means for storing the data.

3. The system of claim 2 wherein the data acquisition system has a plurality of signal conditioning means joined to receive data from a single sensor of the array for processing the raw data.

4. The system of claim 3 wherein the data acquisition system has a preprocessing means capable of processing raw data before storage and before provision to said signal conditioning means.

5. The system of claim 1 wherein said low-level processing comprises:
   a plurality of spectral analysis sections, each capable of receiving processed data from one channel and analyzing a spectral composition of the processed data for the associated channel;
   a plurality of background noise estimation sections, each capable of receiving processed data from one channel and computing a running background noise estimate for the associated channel;
   a detection section joined to receive said spectral composition and the running background noise estimate and capable of determining whether the spectral composition of the received processed data from one channel exceeds the running background noise sufficiently to indicate detection of a contact;
   an event declaration section joined to said detection section to receive an indication that a portion of the processed data for the associated channel should be grouped with previously detected portions as an event; and
   a classification section joined to said event declaration section for receiving processed data grouped as one event, said classification section assigning classes to events based on a predefined classification of the event.

6. The system of claim 5 wherein said running background estimate is computed based on the detection status of one associated channel of processed data.

7. The system of claim 5 wherein said running background estimate is computed based on a preselected frame of one associated channel of processed data.

8. The system of claim 5 wherein said classification section identifies events having predefined criteria as spurious noise and removing these events from further processing.

9. The system of claim 5 wherein said classification system assigns classes based on a statistical classification approach wherein said classification system determines a collection of descriptive features from the processed data for the associated channel, applies a set of rules to determine certain predetermined classes, and uses a likelihood-based approach to determine other predetermined classes.

10. The system of claim 5 wherein said high-level processing section comprises:
    a target tracking section capable of analyzing detected and identified signals of interest from different channels of processed data utilizing assigned classes as part of the analysis; and
    an alert generation section capable of analyzing detected and identified signals to determine if the signals warrant providing an alert to said operator machine interface based on the assigned class.

11. The system of claim 10 wherein said target tracker section is capable of linking events across channels and time.

12. The system of claim 11 wherein said alert generation section is joined to said target tracking section in order to avoid providing alerts for identified signals of interest from different channels having certain predetermined characteristics.

13. The system of claim 5 wherein the operator machine interface includes a map display showing a location of the array of acoustic sensors and capable of displaying a location of at least one event and the assigned class of the event.

14. The system of claim 1 wherein said high-level processing section comprises:
    a target tracking section capable of analyzing detected and identified signals of interest from different channels of processed data; and
    an alert generation section capable of analyzing detected and identified signals to determine if the signals warrant providing an alert to said operator machine interface.

15. The system of claim 14 wherein said target tracker section is capable of linking signals of interest across channels and time.

16. The system of claim 15 wherein said alert generation section is joined to said target tracking section in order to avoid providing alerts for identified signals of interest from different channels having certain predetermined characteristics.

17. The system of claim 1 wherein the operator machine interface includes a map display showing a location of the array of acoustic sensors and a location of detected and identified signals of interest.

18. The system of claim 17 wherein the operator machine interface further includes a zone-time energy history display with detected and identified signals of interest indicated.

19. The system of claim 1 wherein the operator machine interface provides audio reproductions of detected and identified signals of interest.

20. A system for analyzing a plurality of channels of data received from an array of acoustic sensors comprising:
- a data acquisition system capable of receiving and independently processing each channel of data;
- a low-level processing section joined to receive each channel of processed data from said data acquisition system, said low-level processing section capable of detecting and identifying a signal of interest in one channel of data;
- a target tracking section joined to said low-level processing section and being capable of tracking detected signals across multiple channels of data and over time;
- an event database joined to said low-level processing section to receive the detected and identified signals of interest from said low-level processing section, and being further joined to said target tracking section;
- an alert generation section joined to said event database, said alert generation section being capable of analyzing data occurring over a preset duration of time and across multiple channels of data and determining if the signals warrant providing an alert, said alert generation section providing data analysis to said event database; and
- an operator machine interface joined to said event database for providing data analysis, alerts and detected and identified signals of interest.

* * * * *